United States Patent
Naeini et al.

(10) Patent No.: US 12,138,136 B1
(45) Date of Patent: Nov. 12, 2024

(54) ELECTRICAL TOOTHBRUSH

(71) Applicant: Brushent Inc., Toronto (CA)

(72) Inventors: Alireza Naeini, Richmond Hill (CA); Kourosh Ahmadnezhad, Karaj (IR); Mohammadbagher Ebrahimitirtash, Sari (IR); Azadeh Hosseini Farid, Tehran (IR); Mojtaba Geramiparsa, Richmond Hill (CA); Farzad Abedi Dorcheh, Isfahan (IR); Nasser Ashgriz, Thornhill (CA)

( * ) Notice: Subject to any disclaimer, the term of this patent is extended or adjusted under 35 U.S.C. 154(b) by 0 days.

(21) Appl. No.: 18/591,097

(22) Filed: Feb. 29, 2024

(51) Int. Cl.
*A61C 17/34* (2006.01)
*A61C 17/22* (2006.01)

(52) U.S. Cl.
CPC ........ *A61C 17/3472* (2013.01); *A61C 17/221* (2013.01)

(58) Field of Classification Search
USPC ...................................... 15/21.1–28
See application file for complete search history.

(56) References Cited

U.S. PATENT DOCUMENTS

| | | | | |
|---|---|---|---|---|
| 2,618,161 A * | 11/1952 | Mason | ............... | A61C 17/26 476/27 |
| 3,512,201 A * | 5/1970 | Taylor | ............... | A61C 17/26 15/23 |
| 5,383,242 A * | 1/1995 | Bigler | ............... | A61C 17/34 74/57 |
| 2004/0231078 A1* | 11/2004 | Braun | ............ | A61C 17/3472 15/28 |
| 2006/0117505 A1* | 6/2006 | Chan | ............... | A61C 17/349 15/28 |
| 2008/0109973 A1* | 5/2008 | Farrell | ............ | A61C 17/224 15/4 |
| 2008/0196184 A1* | 8/2008 | Mary | ............ | A46B 15/0036 433/29 |
| 2008/0307591 A1* | 12/2008 | Farrell | ............ | A61C 17/349 15/207.2 |
| 2018/0091018 A1* | 3/2018 | Fritsch | ............ | A61C 17/3436 |
| 2019/0083217 A1* | 3/2019 | Triato | ............ | F03G 1/08 |

FOREIGN PATENT DOCUMENTS

JP      H05199917 A * 1/1992

* cited by examiner

*Primary Examiner* — Bryan R Muller
*Assistant Examiner* — Dana Lee Poon
(74) *Attorney, Agent, or Firm* — Nasser Ashgriz; UIPatent Inc.

(57) ABSTRACT

An electric toothbrush comprises a brush head, a motor for providing oscillating rotation, and a multi-directional movement mechanism connected to the brush head to offer a plurality of movements. The movement mechanism includes a first mechanism for converting the motor's rotation into an oscillating rotation, a second mechanism for an oscillating side-to-side movement, and a third mechanism for an oscillating back-and-forth movement. Additionally, a gear system is employed, featuring a main gear with arc teeth on its outer perimeter and a set of equally spaced driven gears. The main gear engages with the driven gears individually, each configured to provide one of the plurality of movements. A control system facilitates the selection of movements and on/off functionality, while a power system supplies necessary power. Encased within an ergonomic waterproof shell, the electric toothbrush ensures protection and comfortable handling.

15 Claims, 17 Drawing Sheets

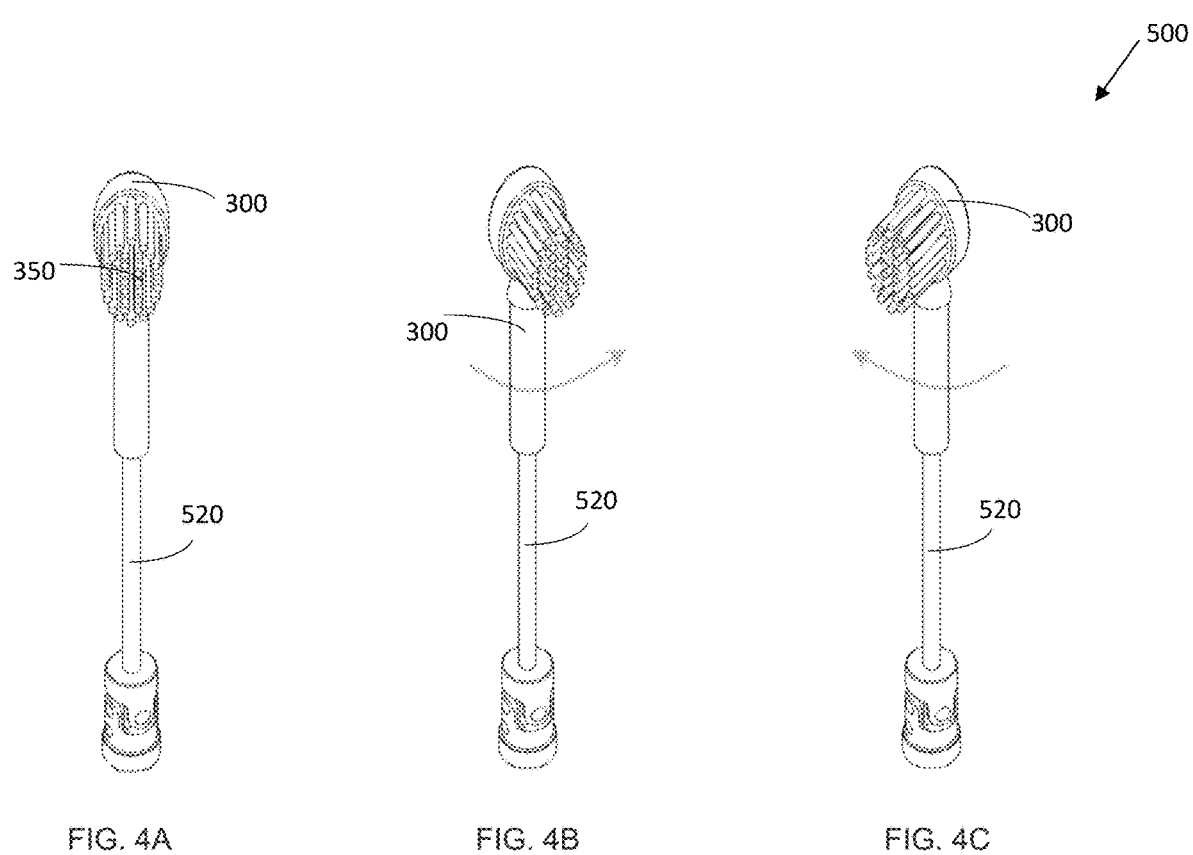

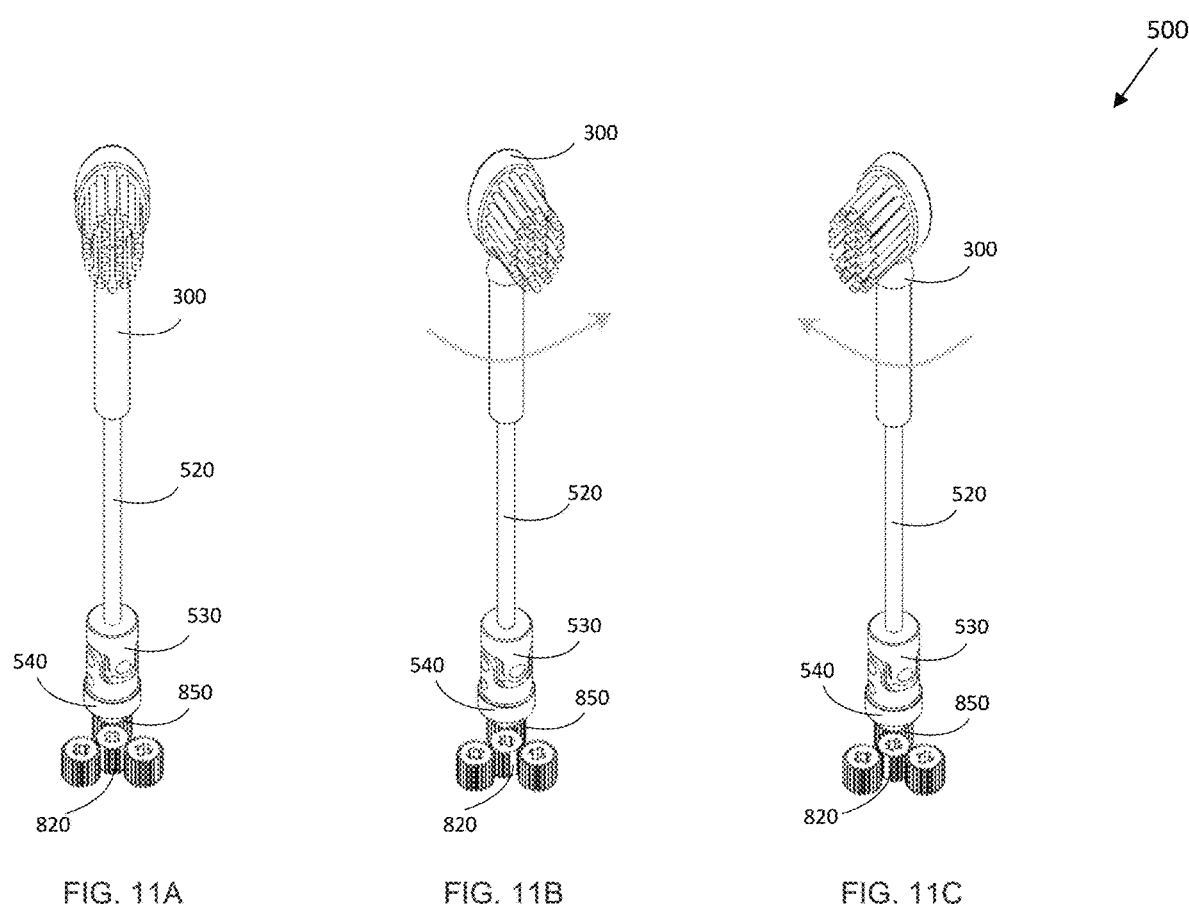

ELECTRICAL TOOTHBRUSH

FIELD OF THE INVENTION

The present disclosure relates to electrical toothbrushes, in particular to electrical toothbrushes with multi-directional brush head movements.

BACKGROUND OF THE INVENTION

Teeth and gums play an important role in the overall health and well-being of people. Oral problems can cause pain, infection, tooth loss, and systemic complications. One of the most effective methods to maintain oral hygiene and prevent dental diseases is by regularly brushing teeth, which helps to eliminate plaque, food particles, and stains from the teeth and gums, and to stimulate blood flow in the oral tissues. However, not all toothbrushes are equally effective.

Conventional toothbrushes typically rely on manual brushing techniques, which may not effectively remove plaque and maintain optimal oral hygiene. Therefore, there is a need for an improved toothbrush that utilizes advanced mechanisms to enhance the cleaning efficiency and effectiveness of brushing.

Existing electric toothbrushes often rely on a single type of brush head movement, typically oscillatory rotation. While they offer some advantages over manual brushing, their limited range of movements may result in incomplete plaque removal and suboptimal oral care. There is a need for an improved toothbrush that utilizes advanced mechanisms to enhance cleaning efficiency and effectiveness.

To address these limitations, the present invention introduces an electrical toothbrush with multi-directional brush head movements. The toothbrush incorporates a motorized mechanism that enables three distinct brush head movements: oscillatory rotation, oscillatory side-to-side movement, and oscillatory back-and-forth movement.

The oscillatory rotation movement mimics the action of manual toothbrushing, facilitating plaque and debris removal from tooth surfaces for improved oral hygiene. The oscillatory side-to-side movement enhances coverage of tooth surfaces and interdental areas, effectively dislodging plaque and food particles from hard-to-reach areas. The oscillatory back-and-forth movement provides a massaging effect on the gums, further enhancing the cleaning action.

By combining these three brush head movements, the electrical toothbrush offers a versatile and customizable brushing experience. Users can select the desired movement mode based on their preferences and oral care needs, ensuring a comprehensive and effective cleaning routine.

Existing electrical toothbrushes often struggle to seamlessly transition between different brushing motions. Recognizing this challenge, the invention incorporates a sophisticated multi-directional movement mechanism. This mechanism, as outlined in the claims, integrates a unique gear system and control system to allow users to switch between brushing modes, ensuring a thorough and adaptable cleaning process.

Further, the field of the invention lies at the intersection of dental care and engineering innovation. It responds to the shortcomings of traditional toothbrushes by introducing a multi-directional movement mechanism, offering users a versatile, efficient, and customizable solution for maintaining optimal oral hygiene. Through a comprehensive combination of advanced features, the electrical toothbrush outlined in the claims seeks to revolutionize the way individuals approach their daily oral care routines.

SUMMARY OF THE INVENTION

An electrical toothbrush that provides multi-direction motion of the toothbrush head is disclosed. This toothbrush comprises a brush head having bristles connected to a main shaft, and a motor to engage with a multi-directional movement mechanism. The multi-directional movement mechanism is connected to the brush head to provide a plurality of movements. The toothbrush has an off position in which the main shaft defines an X axis and the bristles define a Y axis perpendicular to the X axis. The X and Y axes define an X-Y plane and a Z axis perpendicular to the X and Y axes and the X and Z axes define an X-Z plane and the Z and Y axes define a Z-Y plane. In one embodiment of the present toothbrush, a gear system aligned with the Z-Y plane, comprising a main gear and a first, a second, and a third gear is provided. The main gear has one or more partial teeth sections on its outer or inner perimeter that engage with one of the first, second, and third gear one at a time, wherein the main gear is configured to transmit the oscillatory rotation of the motor to each of the first, the second, and the third gear upon engaging with each of them. In the present toothbrush, three different movements are provided. A first movement mechanism to transmit the oscillatory rotation of the first gear to the main shaft to provide an oscillatory rotation of the brush head around the X axis; a second movement mechanism transforms the oscillatory rotation of the second gear to the main shaft to provide an oscillatory side-to-side movement of the brush head aligned in the X-Z plane, and a third movement mechanism transforms the oscillatory rotation of the third gear to the main shaft to provide an oscillatory back-and-forth movement of the brush head aligned in the X-Y plane. A control system to turn on and off the electrical toothbrush and allow a user to select a desired movement from each of the plurality of the movements. A power system, utilizing a rechargeable battery and a charging module, provides sustained operation. The entire assembly is housed within an ergonomic waterproof shell, safeguarding both electrical and mechanical components. The toothbrush has a detachable brush head and may have a variety of bristle designs. The waterproof shell may comprise a customizable grip texture, allowing users to personalize the texture for enhanced comfort and grip.

A user-friendly control system is provided that comprises a push button or touchpad for easy management of power and movement selection.

The first mechanism utilizes a universal joint, allowing the brush head to oscillate while accommodating bending in various directions. The second and third mechanisms employ a motion conversion linkage system to translate the motor's rotation into precise side-to-side and back-and-forth motions, respectively.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 4A shows the first movement mechanism in the off position;

FIG. 4B shows the first movement mechanism at one end of its oscillatory rotation;

FIG. 4C shows the first movement mechanism at another end of its oscillatory rotation;

FIG. 11A shows the first movement mechanism with details and components in the off position;

FIG. 11B shows the first movement mechanism with details and components and is at one end of its oscillatory rotation;

FIG. 11C shows the first movement mechanism with details and components and is at another end of its oscillatory rotation;

FIG. 1A and FIG. 1B respectively shows a side and a front view of one embodiment of the presently disclosed electrical toothbrush 100. It comprises a detachable brush head 300 having bristles 350 and a waterproof shell 200 designed with ergonomic considerations. The waterproof shell 200 has a shape and a texture that facilitates the grip and handling of the toothbrush. The texture of the shell 200 features non-slip materials. To prevent excessive strain on the hand and wrist during brushing, the weight has been distributed evenly to ensure a balanced toothbrush. The push button or the touchpad 240 is conveniently positioned for easy access.

FIG. 2 shows an exploded view of the shell 200 and the brush head 300. The shell 200 comprises a main body 210, an upper body 220, an elastic body 230, and either a push button or a touchpad 240. Main body 210 holds the internal structure which contains electrical and mechanical components and protects them from damages such as damages caused by water and dust. Upper body 220 is positioned on top of the main body 210 and it connects the main body 210 to the elastic body 230. Elastic body 230 connects to the upper body 220 and the brush head 300. The flexibility of the elastic body 230 allows the brush head 300 to move without any hindrance.

FIG. 3 shows a view of the presently disclosed electrical toothbrush 100 in an off position. The brush head 300 is connected to a main shaft 520. In the off position, the main shaft 520 defines an X axis and the bristles 350 define a Y axis perpendicular to the X axis. The X and Y axes define an X-Y plane and a Z axis perpendicular to the X and Y axes. The X and Z axes define an X-Z plane and the Z and Y axes define a Z-Y plane.

As shown in FIGS. 4A-C, FIGS. 5A-C, and FIGS. 6A-C, in one embodiment, the present toothbrush can provide three different brush head movements: oscillatory rotation 500 around the X axis, oscillatory side-to-side movement 600 aligned in the X-Z plane, and oscillatory back-and-forth movement 700 aligned in the X-Y plane. FIGS. 3A, 3B, and 3C illustrate the first movement mechanism 500 that provides the oscillatory rotational of the brush head 300. Initially, the brush head 300 is in the off position, where the main shaft 520 is aligned in the X axis and the bristles 350 are aligned in the Y axis (FIG. 4A). When the first movement mechanism 500 starts, the brush head 300 and the main shaft 520 rotate counterclockwise (FIG. 4B) and then clockwise (FIG. 4C) in a continuous repeating motion around the X axis. During the oscillatory rotation, the main shaft 520 remains aligned in the X axis.

FIGS. 5A, 5B, and 5C show the second movement 600 that provides the oscillatory side-to-side movement of the brush head 300 aligned in the X-Z plane. Initially, the brush head 300 is in the off position, where the main shaft 520 is aligned in the X axis and the bristles 350 are aligned in the Y axis (FIG. 5A). When the second movement mechanism 600 starts, the brush head 300 and main shaft 520 lean to the left side (FIG. 5B) and then lean to the right side (FIG. 5C), in a continuous repeating pattern aligned in the X-Z plane.

FIGS. 66A, 6B, and 66C show the third movement 700 that provides the oscillatory back-and-forth movement of the brush head 300 aligned in the X-Y plane. Initially, the brush head 300 is in the off position, where the main shaft 520 is aligned in the X axis and the bristles 350 are aligned in the Y axis (FIG. 6A). When the third movement mechanism 700 starts, the brush head 300 and main shaft 520 lean forward (FIG. 6B) and then lean backward (FIG. 6C) in a continuous repeating pattern aligned in the X-Y plane.

FIGS. 7A, 7B, and 7C illustrate a first embodiment of a gear system 800 utilized in the electrical toothbrush 100. This gear system 800 is aligned with the Z-Y plane and comprises a main gear 820 and three driven gears: a first gear 850, a second gear 860, and a third gear 870. The main gear 820 and three driven gears 850, 860, and 870 are in the form of external gears which means their teeth are positioned on the outer perimeter of the gears. Three driven gears 850, 860, and 870 are positioned on the outer perimeter of the main gear 820. Each driven gear 850, 860, and 870 corresponds to one of the three movement mechanisms 500, 600, or 700. The first gear 850 corresponds to the first movement mechanism 500, the second gear 860 corresponds to the second movement mechanism 600, and the third gear 870 corresponds to the third movement mechanism 700. The main gear has a partial teeth design with two partial teeth sections on its outer perimeter, while the remaining perimeter is toothless. This design allows the main gear 820 to engage with one driven gear 850, 860, or 870 at a time, enabling the electrical toothbrush 100 to perform the associated movement. For example, when the main gear 820 engages with the first gear 850, the other two gears 860 and 870 disengage from the system, resulting in the electrical toothbrush 100 performing the first movement 500. The main gear 820 is directly connected to a motor 920. The motor 920 produces an oscillatory rotation, alternating between clockwise and counterclockwise directions. This oscillatory movement of the motor 920 is transmitted to the main gear 820, causing it to rotate in a corresponding alternating manner. As a result, the main gear 820 replicates the motor's oscillatory rotation by repeatedly rotating clockwise and counterclockwise, which is then transferred to one of the driven gears 850, 860, or 870, facilitating the desired movement.

FIGS. 8A, 8B, and 8C illustrate a second embodiment of a gear system 801 that is utilized in the electrical toothbrush 100. This gear system 800 is aligned with the Z-Y plane and comprises a main gear 821 and three driven gears: a first gear 851, a second gear 861, and a third gear 871. The main gear 821 and three driven gears 851, 861, and 871 are in the form of internal gears which means their teeth are positioned on the inner perimeter of the gears. Three driven gears 851, 861, and 871 are positioned on the inner perimeter of the main gear 821. Each driven gear 851, 861, and 871 corresponds to one of the three movement mechanisms 500, 600, or 700. The first gear 851 corresponds to the first movement mechanism 500, the second gear 861 corresponds to the second movement mechanism 600, and the third gear 871 corresponds to the third movement mechanism 700. The main gear 821 has a partial teeth design with two partial teeth sections on its inner perimeter, while the remaining perimeter is toothless. This design allows the main gear 821 to engage with one driven gear 851, 861, or 871 at a time, enabling the electrical toothbrush 100 to perform the associated movement As shown in FIG. 9 the main gear 821 is directly connected to the motor 920 through a motor coupling 910. The motor 920 produces an oscillatory rotation, alternating between clockwise and counterclockwise directions. This oscillatory movement of the motor 920 is transmitted to the main gear 821, causing it to rotate in a corresponding alternating manner. A set of balls 831 around the outer perimeter of the main gear 821 is used to reduce the amount of friction. As a result, the main gear 821 replicates the motor's oscillatory rotation by repeatedly rotating clockwise and counterclockwise, which is then transferred to one of the driven gears 851, 861, or 871, facilitating the desired movement.

The motor may be a variable speed motor with a controller, allowing users to adjust the speed of the oscillatory movements of the brush head.

Figures 5A, 5B, 5C:
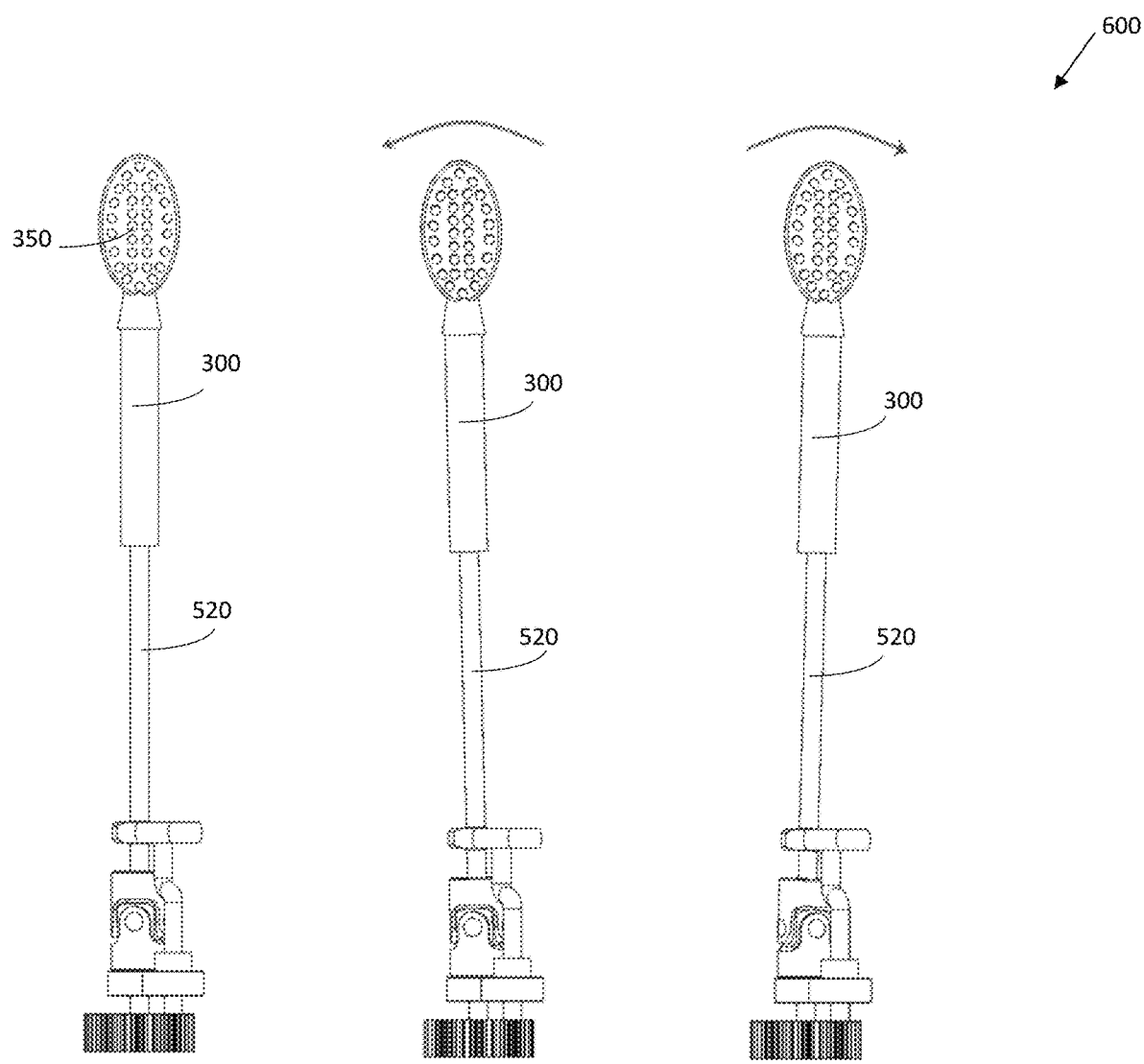
FIG. 5A shows the second movement mechanism in the off position.
FIG. 5B shows the second movement mechanism at one end of its oscillatory movement.
FIG. 5C shows the second movement mechanism at another end of its oscillatory movement.
Figures 6A, 6B, 6C:
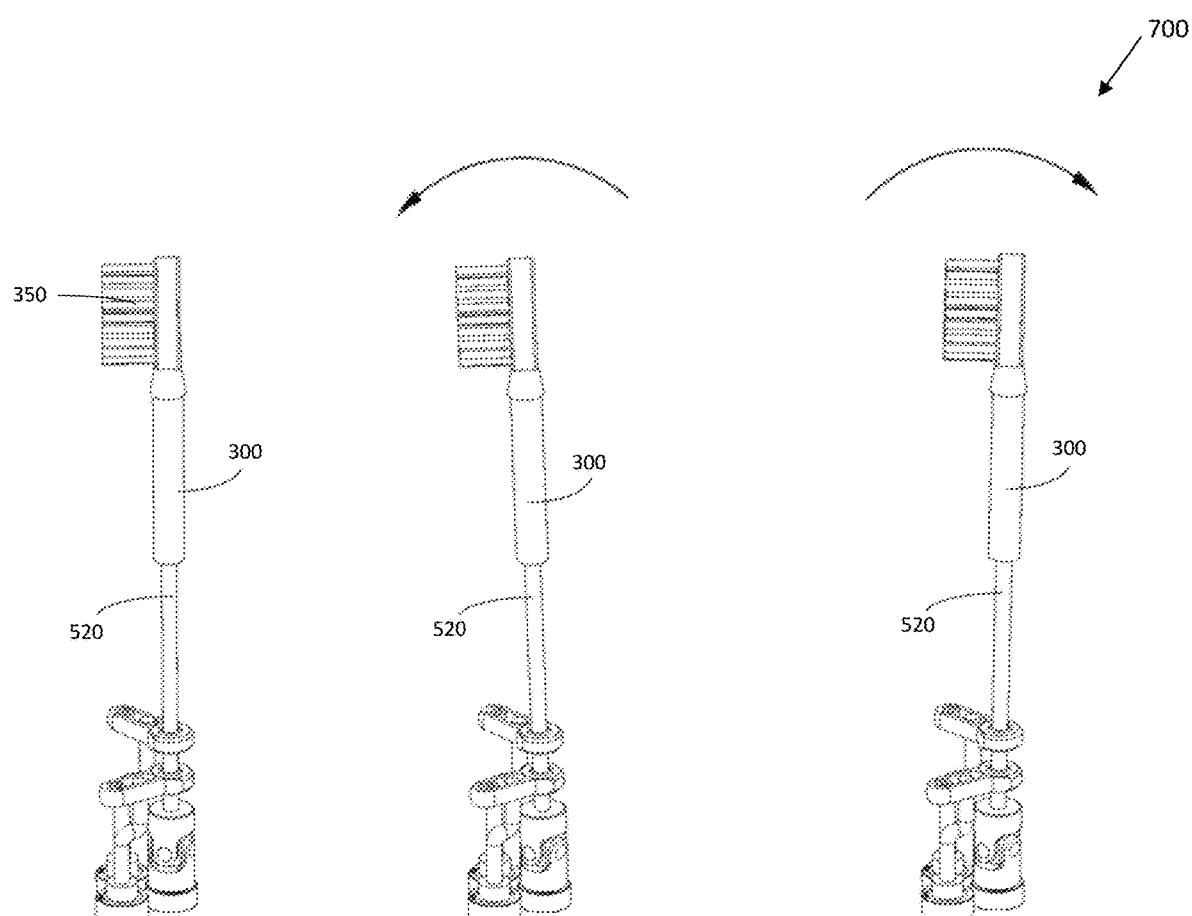
FIG. 6A shows the third movement mechanism in the off position.
FIG. 6B shows the third movement mechanism at one end of its oscillatory movement.
FIG. 6C shows the third movement mechanism at another end of its oscillatory movement.
Figure 7A:
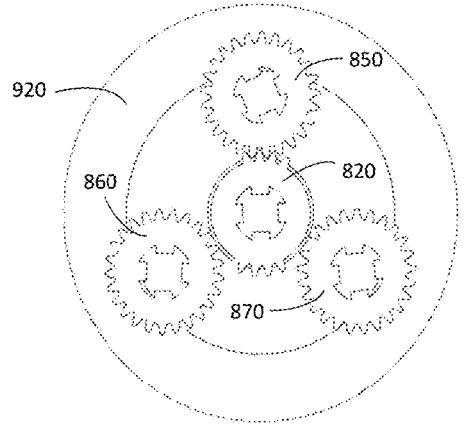
FIG. 7A shows the first embodiment of the gear system when the first gear is engaged with the main gear.
Figure 7B:
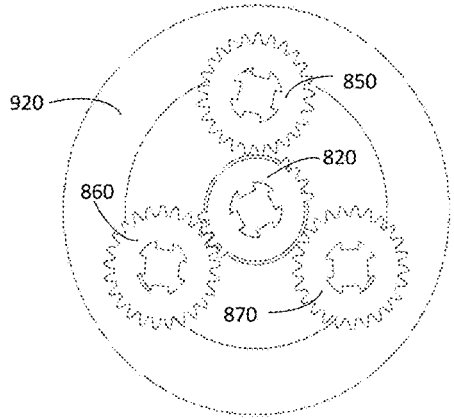
FIG. 7B shows the first embodiment of the gear system when the second gear is engaged with the main gear.
Figure 7C:
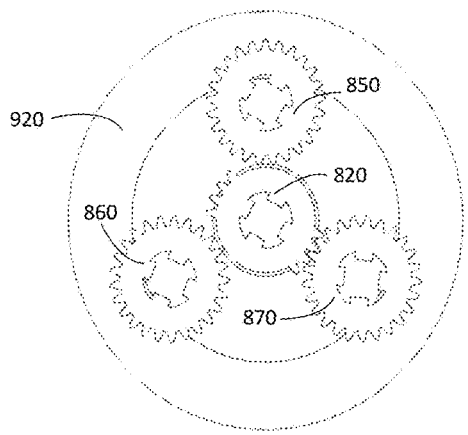
FIG. 7C shows the first embodiment of the gear system when the third gear is engaged with the main gear.
Figure 8A:
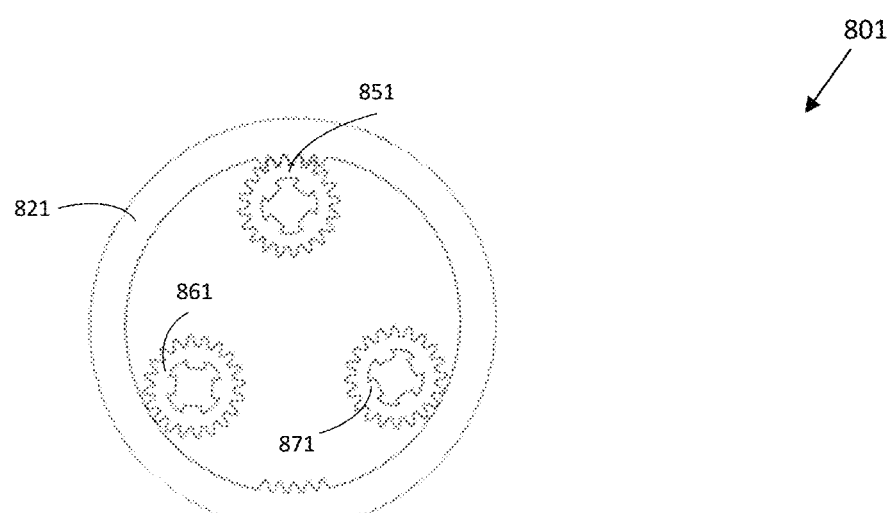
FIG. 8A shows the second embodiment of the gear system when the first gear is engaged with the main gear.
Figure 8B:
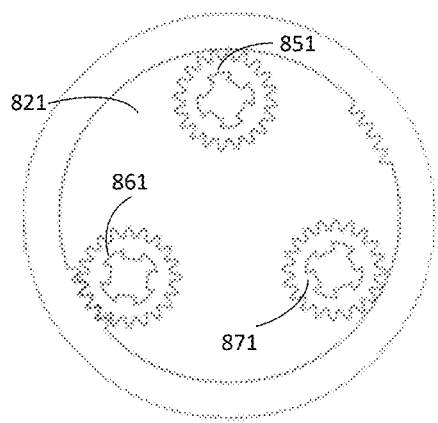
FIG. 8B shows the second embodiment of the gear system when the second gear is engaged with the main gear.
Figure 8C:
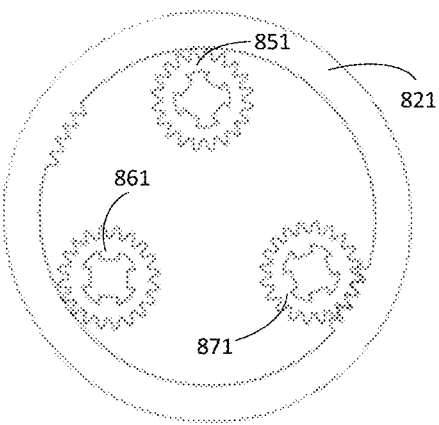
FIG. 8C shows the second embodiment of the gear system when the third gear is engaged with the main gear.
Figure 9:
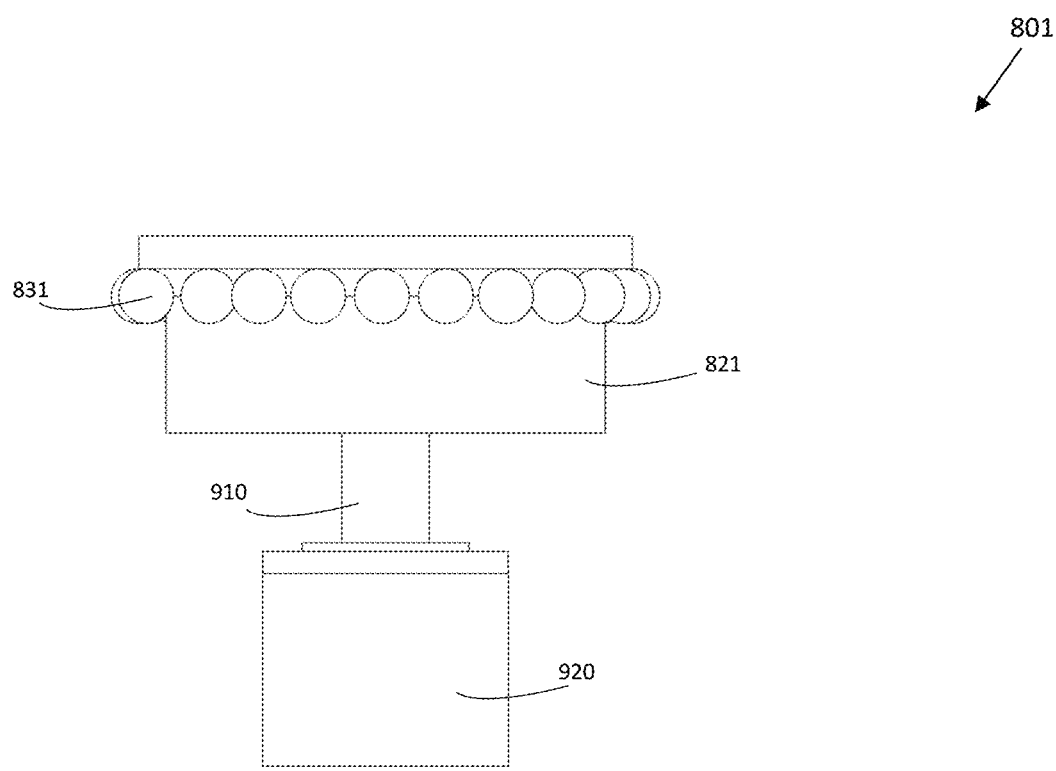
FIG. 9 shows a side view of the connection between the second gear system and the motor.

FIGS. 4A, 5A, and 6A show the brush head 300 in the off position. When the main gear 820 isn't engaging with any driven gears 850, 860, or 870, the brush head 300 is in the off position This position serves as the starting point for the electrical toothbrush 100 before any movement 500, 600, or 700 is initiated. In the off position, the brush head 300 has not rotated left or right, nor has it leaned back and forth or side to side. Whenever the electrical toothbrush 100 mode transitions from one movement 500, 600, or 700 to another, the main gear 820 disengages from the current gear 850, 860, or 870 and engages with the next one. During this transition, the brush head 300 returns to the off position in which the main shaft 520 becomes aligned in the X axis and the bristles 350 become aligned in the Y axis. This ensures that the toothbrush starts from the off position before executing the movement 500, 600, or 700 associated with the newly engaged driven gear 850, 860, or 870.

Figure 1:
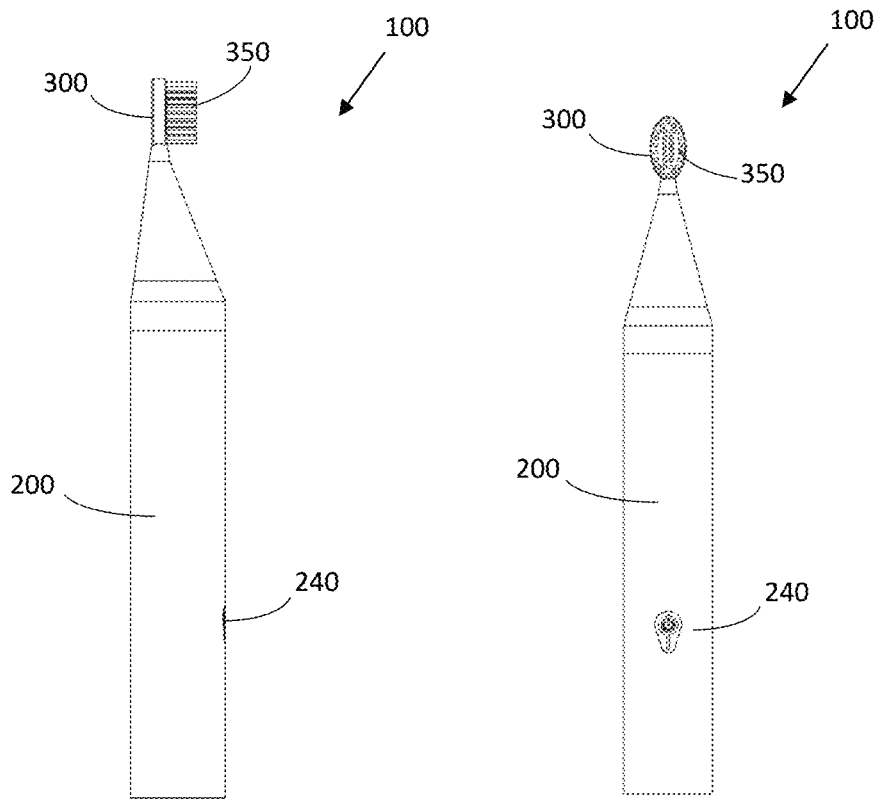
FIG. 1A shows one embodiment of the invention.
FIG. 1B shows another view of one embodiment of the invention.
Figure 2:
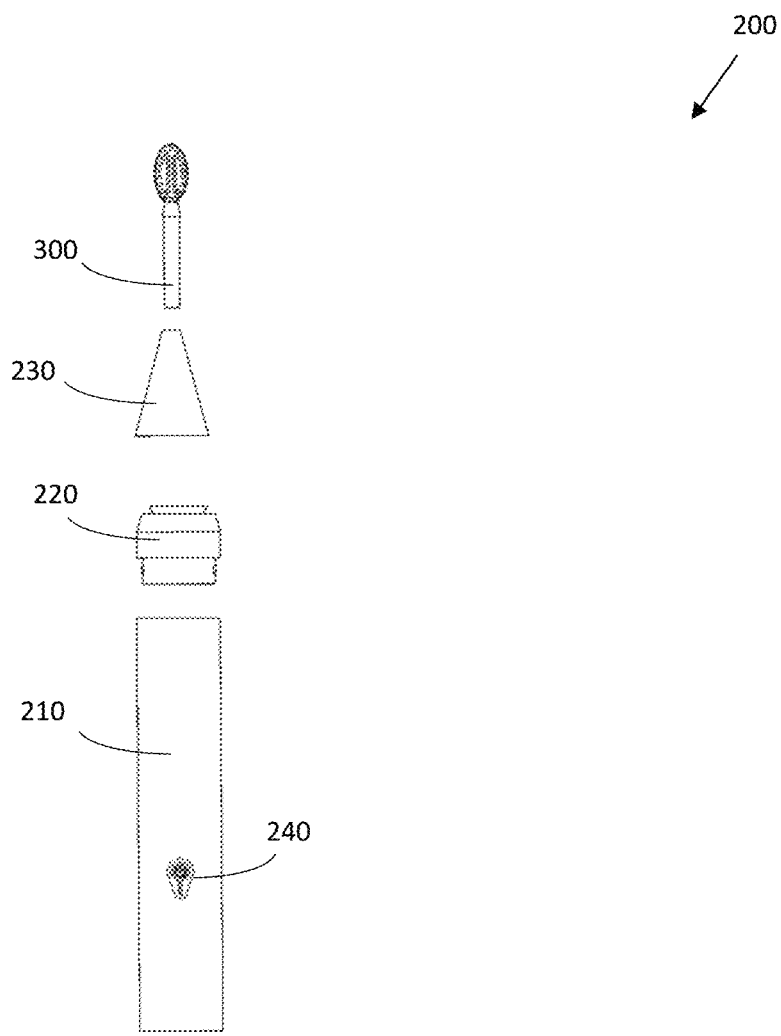
FIG. 2 shows an exploded view of the shell of the invention.
Figure 3:
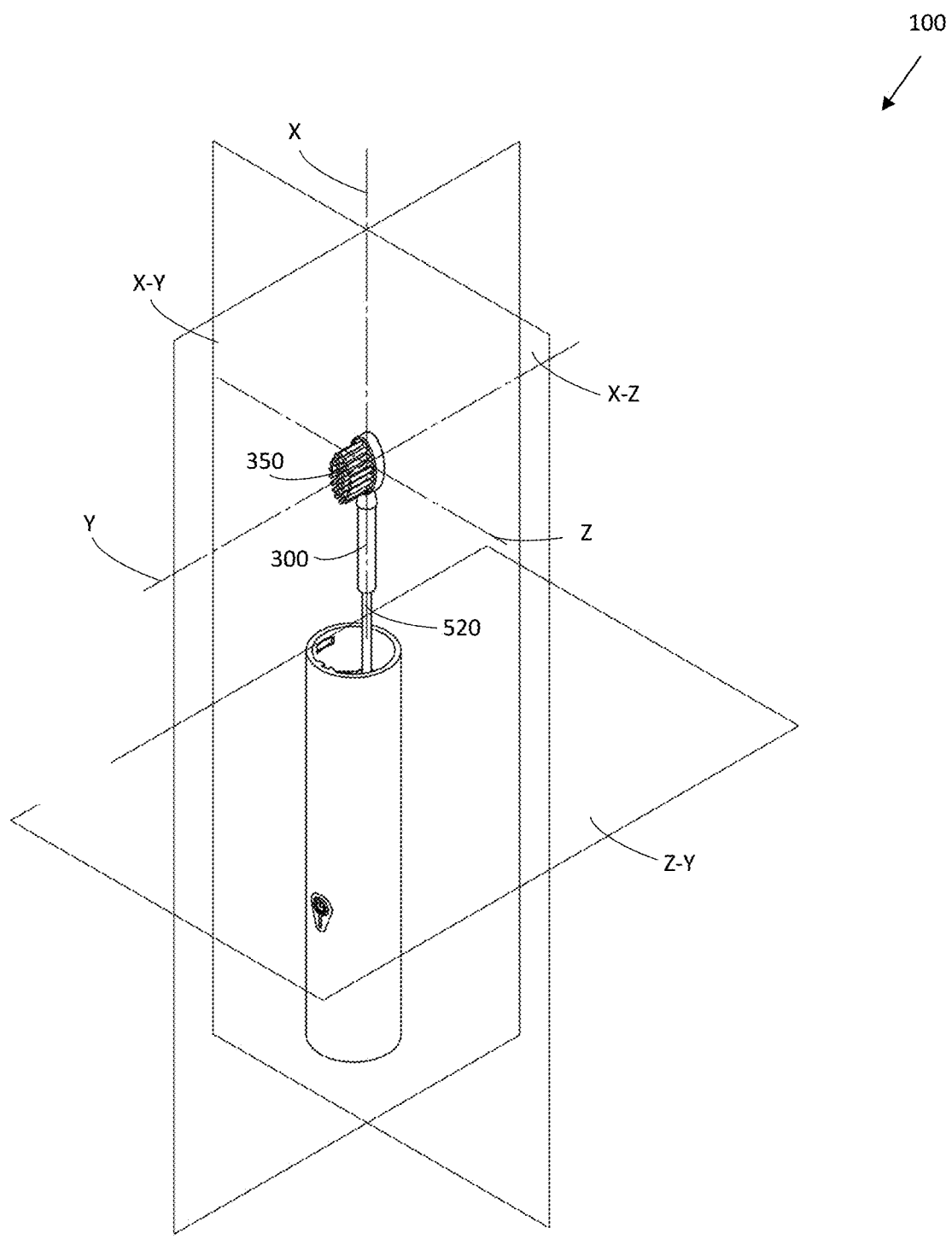
FIG. 3 shows the embodiment of the invention in an off position.

The elastic body 230 keeps the main shaft 520 in the initial position before the movements start and returns it to the off position in between changing movements. Furthermore, the elastic body 230 (shown in FIG. 2) facilitates the main shaft's return 520 to the off position by absorbing external forces during movement and exerting a restoring force when the main gear 820 is not engaged with any of the driven gears 850, 860, or 870. This mechanism ensures that the main shaft 520 remains at the off position before movement starts and returns to it between changing movements.

Figure 10:
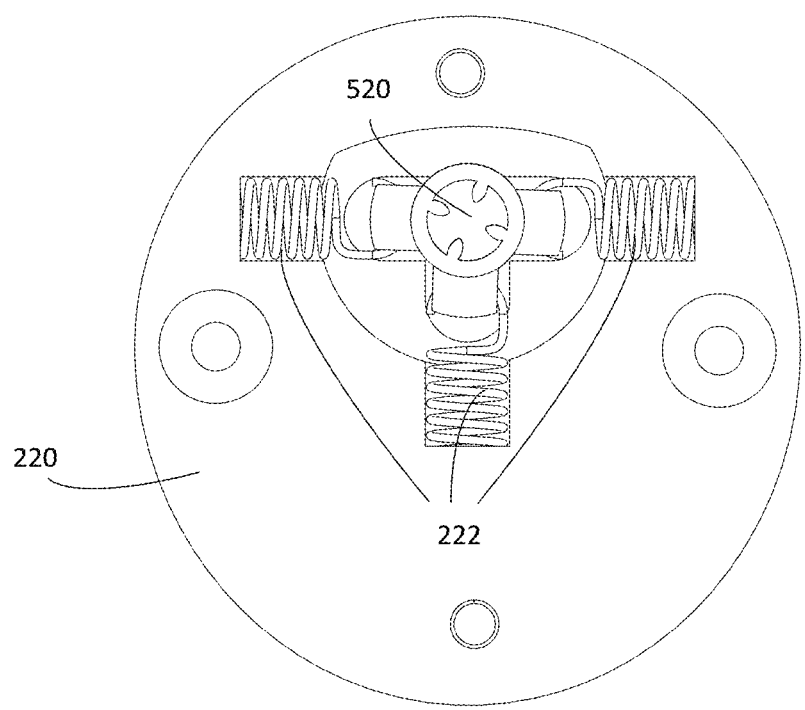
FIG. 10 shows the spring system and its mechanism.

FIG. 10 illustrates a spring system 225 embedded in the upper body 220. The spring system 225 includes a set of springs 222 that are connected to the main shaft 520 at one end and the upper body 220 at the other end. When the main shaft 520 is in the position, the springs 222 remain in a state of free length, indicating that they are neither stretched nor compressed. When the main shaft 520 deviates from the position, the springs 222 undergo stretching or compression, accumulating force. Upon disengagement of the motor 920 from one of the driven gears 850, 860, or 870, the stored force returns the main shaft 520 to the off position.

FIGS. 11A, 11B, and 11C illustrate the first movement mechanism 500 and the functionality of its components. The first gear 850 can be connected to the main shaft 520 through a first movement bearing 540 and a universal joint 530. When the main gear 820 is not engaged with the first gear 850, the first movement mechanism 500 remains inactive, and the main shaft 520 stays in the off position (FIG. 40-11A). Upon engagement between the main gear 820 and the first gear 850, the first gear 850 initiates an oscillatory rotation aligned in the Y-Z plane. Since the main shaft 520 and the universal joint 530 are connected to the first gear 850, the main shaft 520 and the universal joint 530 replicate the first gear's 850 oscillatory rotation. As a result, the main shaft 520 and the brush head 300 repeatedly rotate clockwise and counterclockwise around the X axis (FIGS. 11B, and 11C). The first movement bearing 540 is used to reduce the amount of friction. Furthermore, the universal joint, incorporated within the first movement mechanism 500, functions as a coupling element. Due to its inherent flexibility, it provides functionality for the second movement mechanism 600 and the third movement mechanism 700. The universal joint 530 allows the main shaft 520 to bend in various directions, facilitating the execution of both the second 600 and third 700 movements.

Figures 12A, 12B, 12C:
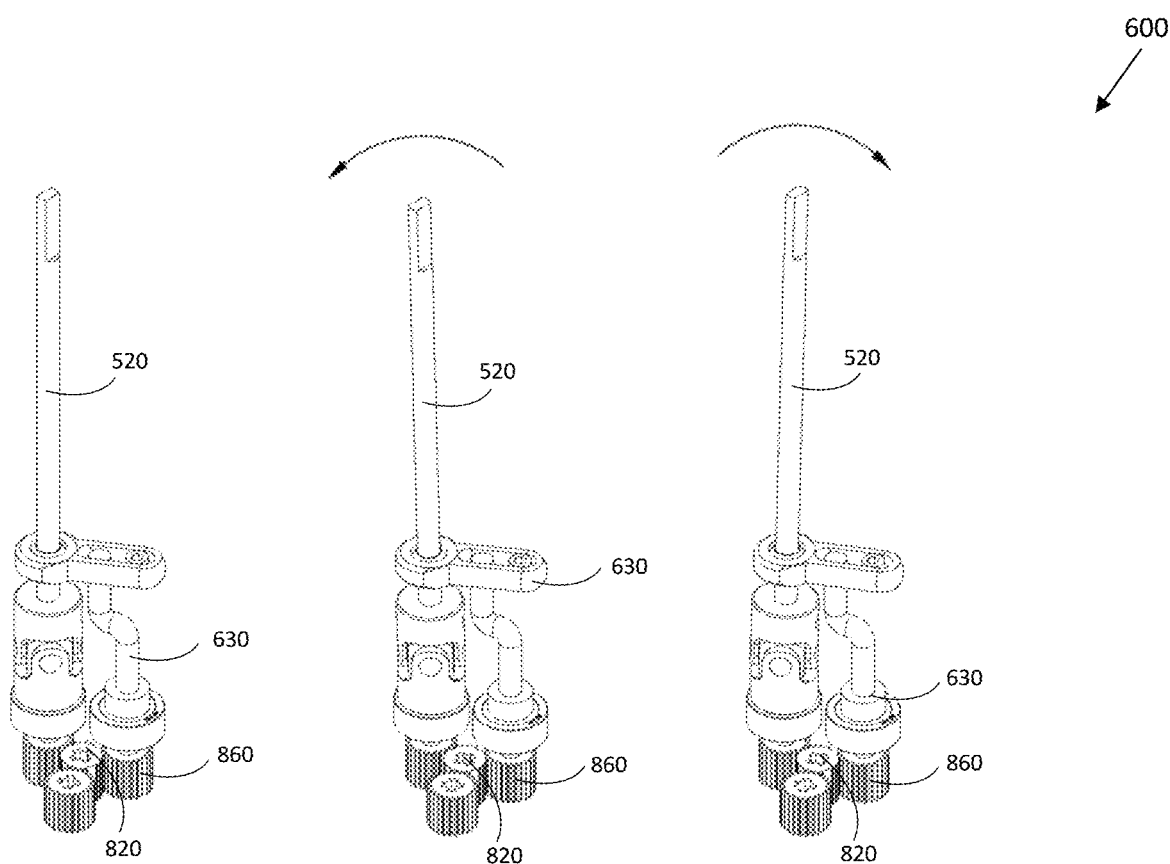
FIG. 12A shows the second movement mechanism with details and components in the off position.
FIG. 12B shows the second movement mechanism with details and components and is at one end of its oscillatory movement.
FIG. 12C shows the second movement mechanism with details and components and is at another end of its oscillatory movement.

FIGS. 12A, 12B, and 12C illustrate the second movement mechanism 600 and the functionality of its components. The second gear 620 can be connected to the main shaft 520 through a second motion conversion linkage system 630. When the main gear 820 is not engaged with the second gear 620, the second movement mechanism 600 remains inactive, and the main shaft 520 stays in the off position (FIG. 12A). Upon engagement between the main gear 820 and the second gear 620, the second gear 620 initiates an oscillatory rotation aligned with the Z-Y plane. The second motion conversion linkage system 630 transfers this oscillatory rotation to the main shaft 520, converting it into an oscillatory side-to-side movement aligned in the X-Z plane. This implies that the main shaft 520 moves in a repetitive motion, alternating between leaning left and leaning right aligned in the X-Z plane (FIGS. 44-12B, and 44-12C).

Figure 13A:
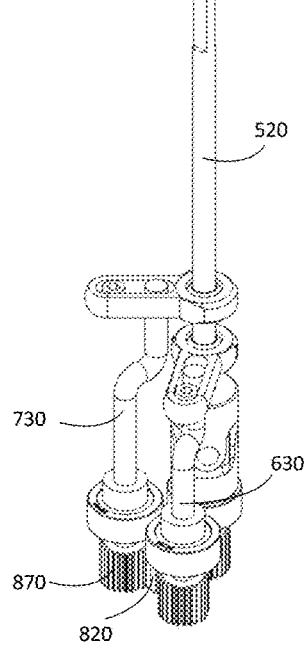
FIG. 13A shows the third movement mechanism with details and components in the off position.
Figure 13B:
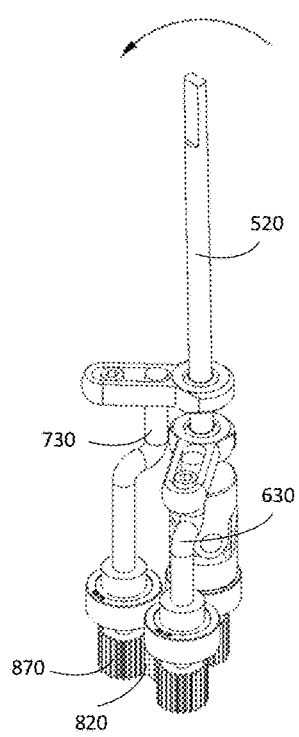
FIG. 13B shows the third movement mechanism with details and components and is at one end of its oscillatory movement.
Figure 13C:
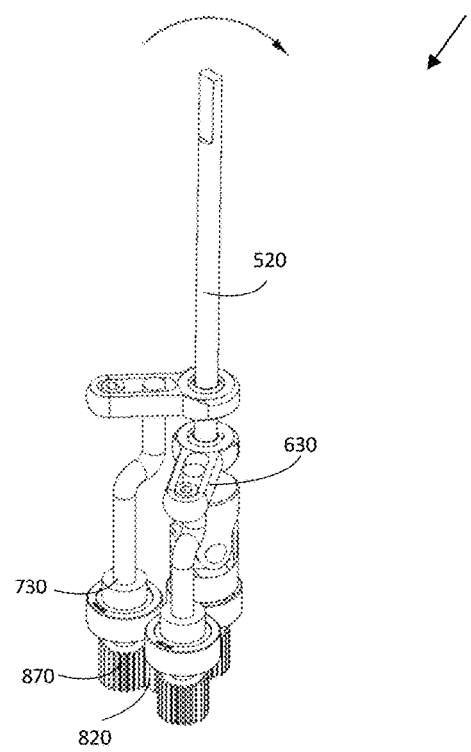
FIG. 13C shows the third movement mechanism with details and components and is another end of its oscillatory movement.

FIGS. 13A, 13B, and 13C illustrate the third movement mechanism 700 and the functionality of its components. The third movement mechanism 700 operates similarly to the second movement mechanism 600. The third gear 870 can be connected to the main shaft 520 through a third motion conversion linkage system 730. When the main gear 820 is not engaged with the third gear 870, the third movement mechanism 700 remains inactive, and the main shaft 520 stays in the off position (FIG. 13A). Upon engagement between the main gear 820 and the third gear 870, the third gear 870 initiates an oscillatory rotation aligned in the Z-Y plane. The third motion conversion linkage system 730 transfers this oscillatory rotation to the main shaft 520, converting it into an oscillatory side-to-side movement. The connection point of the third motion conversion linkage system 730 to the main shaft 520 forms a 90-degree angle with the connection point of the second motion conversion linkage system 630. As a result, the oscillatory side-to-side movement changes direction for a 90-degree angle and becomes an oscillatory back-and-forth movement of the main shaft 520 aligned in the X-Y plane. This implies that the main shaft 520 moves in a repetitive motion, alternating between leaning backward and leaning forward, aligned in the X-Y plane (FIGS. 13B, and 13C).

Figure 14:
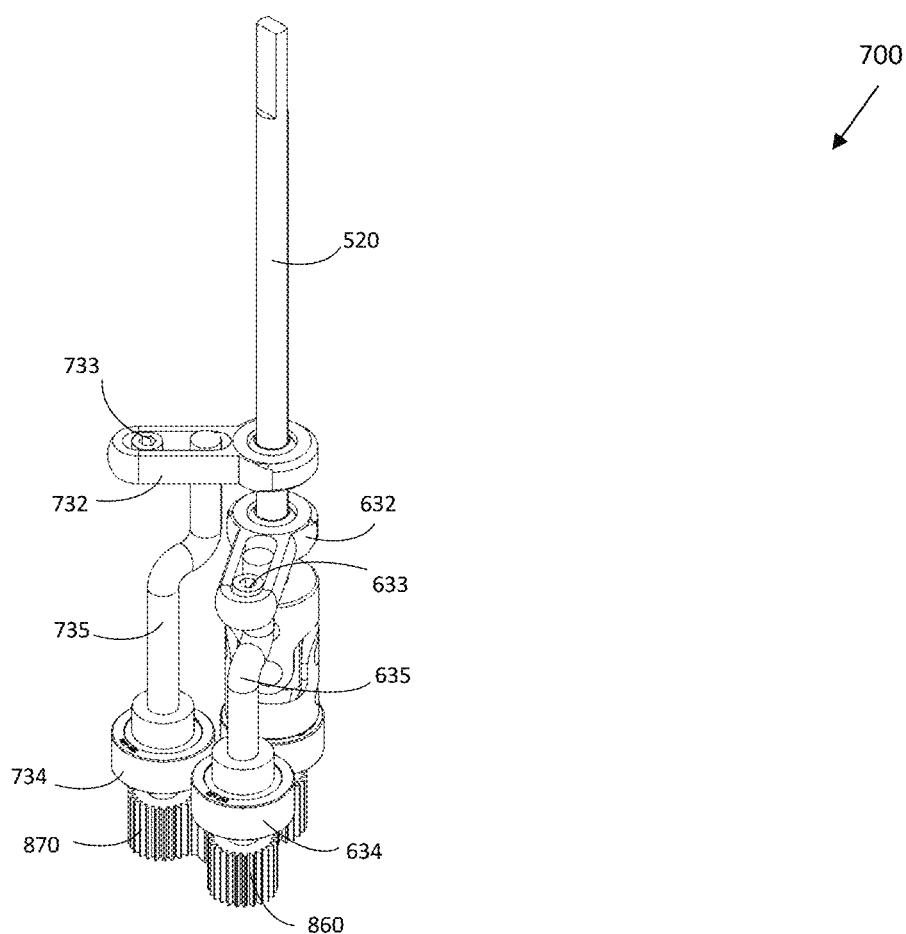
FIG. 14 shows the mechanism of the first motion conversion linkage systems and the second motion conversion linkage systems.

FIG. 14 illustrates the mechanisms of the second and third motion conversion linkage systems 630, and 730. These systems share similar structures and functions, each consisting of a movement shaft 635, 735, a rod end bearing 632, 732, a pin 633, 733, and a bearing 634, 734. The movement shafts 635 and 735 have an L shape. In the second movement mechanism 600, the second movement shaft 635 connects to the second movement gear 860 through a bearing 634 at one end and is slotted in the second movement rod end bearing 632 at the other end. The rod end bearing 632 is hinged around the pin 633. Similarly, in the third movement mechanism 700, the third movement shaft 735 connects to the third movement gear 870 through a bearing 734 at one end and is slotted in the third movement rod end bearing 732 at the other end. The rod end bearing 732 is hinged around the pin 733. The main shaft 520 is connected to both rod end bearings 632 and 732. Within each motion conversion linkage system 630 or 730, when the movement shaft 635 or 735 undergoes rotation, it induces a revolving motion of the connected rod end bearing 632 or 732 around the axis of the respective pin 633 or 733. Therefore, the main shaft 520, which is attached to both rod end bearings 632 and 732, also spins around the axis of the pin 633 or 733. When the main shaft 520 undergoes a partial rotation, it follows a small arc within the circular path, giving the impression of linear motion. As a result, the main shaft 520 appears to lean along its axis instead of rotating around the pin 633 or 733.

The present electrical toothbrush can be configured to provide different speeds for each of the multiple oscillatory movements while using a fixed-speed motor. This can be accomplished by adjusting the gear ratio between the main gear and the driven gears, wherein the driven gear with a smaller gear ratio rotates at a higher speed than the driven gear with a larger gear ratio. As a result, the movement mechanism connected to the driven gear with the smaller gear ratio enables faster oscillatory movements compared to the driven gear with the larger gear ratio. In this configuration, each of the plurality of movements has an individual speed of oscillation.

The present electrical toothbrush may also be configured to allow a user to change the amplitude of the motion of the brush head in each mode of operation. This can be achieved by changing the amplitude of the oscillatory motion of the motor.

Figure 15:
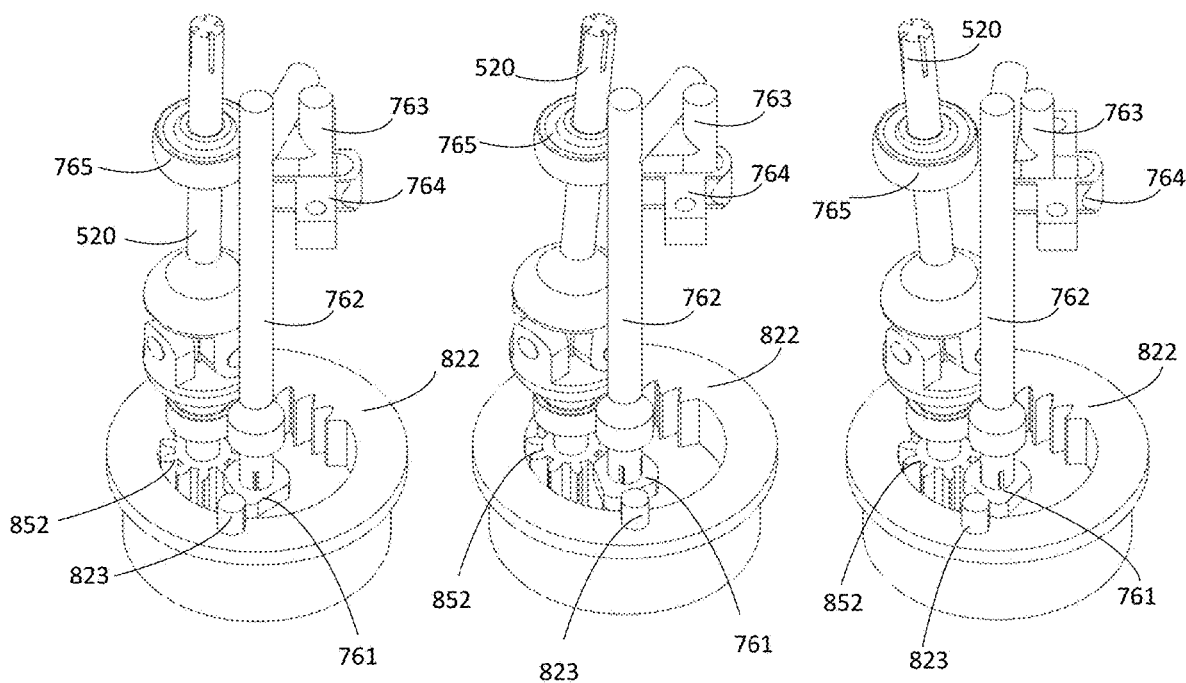
FIG. 15A shows the cam and follower mechanism with details and components in the off position.
FIG. 15B shows the cam and follower mechanism with details and components and is at one end of its oscillatory movement.
FIG. 15C shows the cam and follower mechanism with details and components and is at another end of its oscillatory movement.

FIGS. 15A, 15B, and 15C show a cam and follower mechanism 760 that is employed to provide the second movement or the third movement of the brush head 300 in another embodiment of the electrical toothbrush. The cam and follower mechanism 760 comprises a cam 761, an L-shaped shaft 762, a T-shaped pin 763, a fixed slot 764, and a rod end bearing 765. In this embodiment, the L-shaped shaft 762 is connected to the cam 761 on one end and is in contact with one of the vertical arms of the T-shaped pin 763 on the other end. The other vertical arm of the T-shaped pin 763 slides along the fixed slot 764, while the horizontal arm of the T-shaped pin 763 is linked to the rod end bearing 765 that secures the main shaft 520. The cam and follower mechanism 760 is connected to a gear system that is aligned with the Z-Y plane and comprises a main gear 822 in the form of an internal gear with one or more partial teeth sections on its inner perimeter, a first gear 852 in the form of an external gear positioned along the inner perimeter of the main gear 822, and a protrusion 823 on the main gear's perimeter. The first gear 852 corresponds to the first movement, wherein the main gear 822 transmits the oscillatory rotation of the motor to the first gear 852 upon engaging with the first gear 852. Since the main shaft 520 and the universal joint 530 are connected to the first gear 852, the main shaft 520 and the universal joint 530 replicate the first gear's 852 oscillatory rotation. As a result, the main shaft 520 and the brush head 300 repeatedly rotate clockwise and counterclockwise around the X axis. The protrusion 823 on the main gear 822 replicates the oscillatory rotation of the main gear 822 and motor. When the protrusion 823 is not in touch with the cam 761, the cam and follower mechanism 760 remains inactive, and the main shaft 520 stays in the off position (FIG. 15A). Upon engagement between the protrusion 823 on the main gear 822 and the cam 761, the cam 761 and the shaft 762 initiate an oscillatory rotation, propelling the T-shaped pin 763 along the fixed slot 764 and inducing a linear motion in the connected rod end bearing 765 and the main shaft 520. Therefore, the main shaft 520 leans along its axis from side to side (FIGS. 15B, and 15C).

For initiating the second movement and the third movement the connection point of the rod end bearings 765 to the main shaft 520 forms a 90-degree angle with each other. In this structure one of the cam and follower mechanisms 760 provides the second movement by inducing an oscillatory side-to-side movement in the main shaft 520 aligned in the X-Z plane and the other cam and follower mechanism 760 provides the third movement by inducing an oscillatory back-and-forth movement in the main shaft 520 aligned in the X-Y plane.

The multi-directional movement mechanism of the brush head can be provided by a combination of the cam and follower mechanism and the motion conversion linkage system where any of the second movement and the third movement can be provided by each of these two mechanisms.

Figure 16:
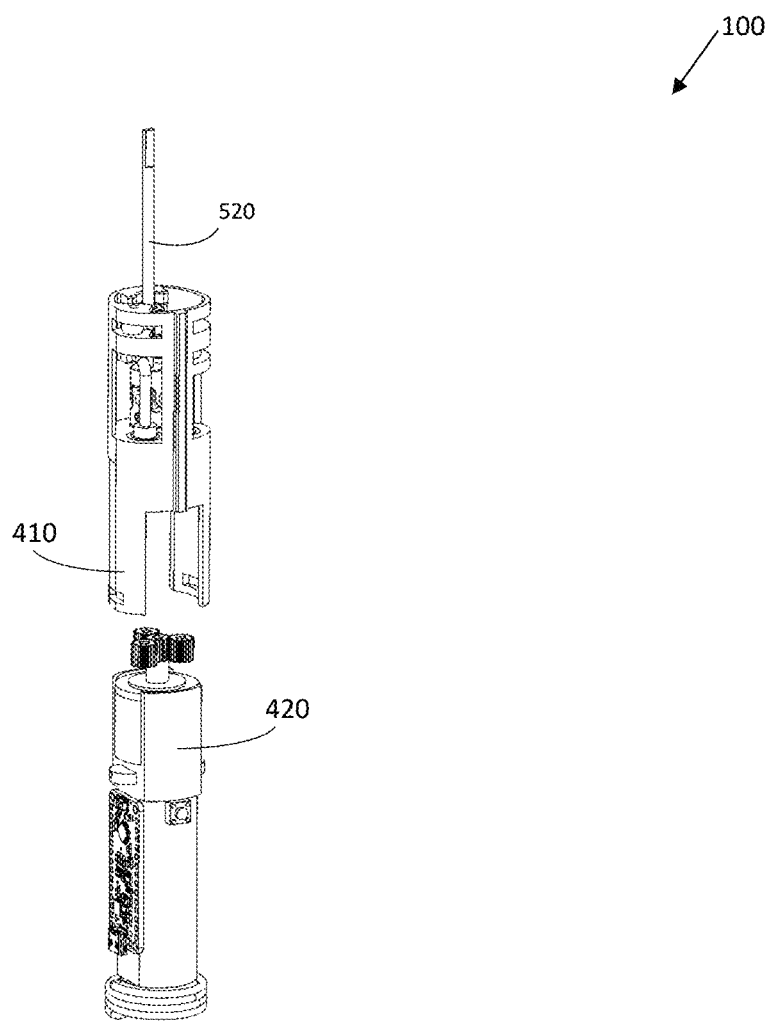
FIG. 16 shows a two-part structure with components assembled on these two parts.

FIG. 16 shows a two-part structure with different components assembled into each part. The lower part 420 is where the electrical components are mounted, while the upper part 410 is where the mechanical components are mounted. The mechanical components comprise the main shaft 520, two sets of the motion conversion linkage system 630, and 730, and the universal joint 530.

Figure 17:
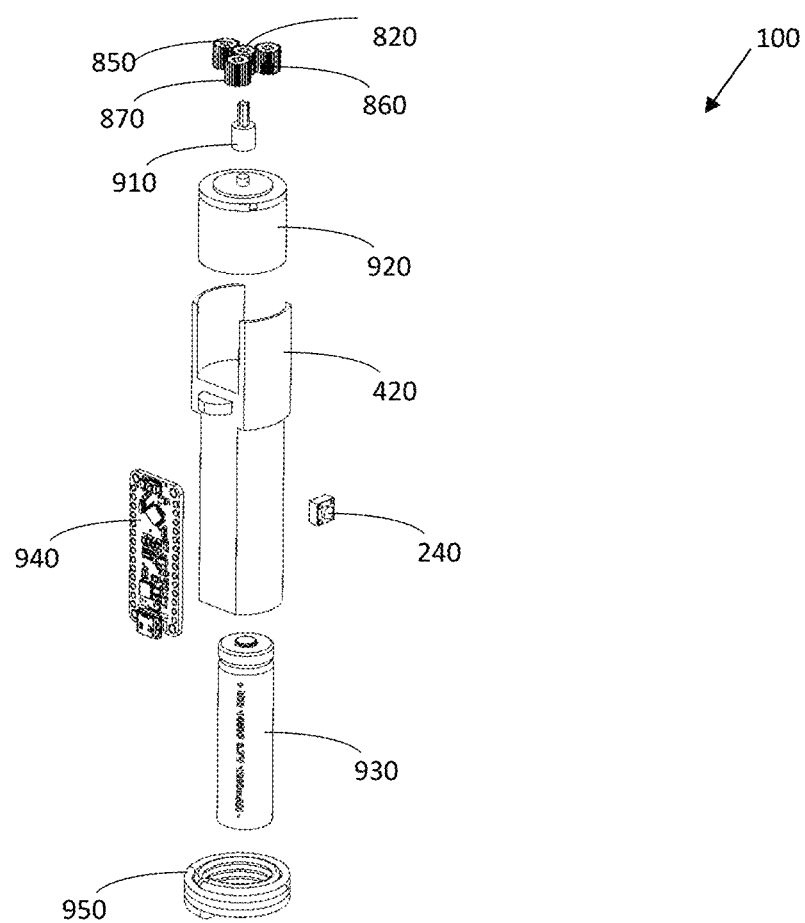
FIG. 17 shows an exploded view of the lower structure part with components assembled on this part.

FIG. 17 presents an exploded view of the lower structure part 420 with components assembled onto it. This figure shows the following components: a motor 920, a motor coupling 910, a power supply 930, an electrical board 940, a charging module 950, a push button or a touchpad 240, a first gear system 800 includes the main gear 820, the first gear 850, the second gear 860, and the third gear 870. The push button or a touchpad 240 serves multiple functions, including turning the electrical toothbrush 100 on and off and changing the mode of movement. The electrical board 940 commands and controls the motor 920, directing it to rotate based on the current movement mode. The motor coupling 910 transfers this rotation to the main gear 820 when it engages with one of the other three gears 850, 860, or 870. The specific gear engagement depends on the selected mode of movement, determining which movement mechanism 500, 600, or 700 is activated. The power supply 930 is a rechargeable battery that provides electricity to both the electrical board 940 and the motor 920. Additionally, a charging module 950 is Incorporated to facilitate the charging of the power supply 930.

The electrical toothbrush of the present system may further comprise one or more sensors, such as pressure sensors, that detect the pressure applied by the brush head on the teeth and gums. The pressure sensors may be integrated into the brush head, providing feedback to the user and adjusting the oscillating movements based on applied pressure during brushing. The pressure sensor may also be used to provide positional feedback to the user interface, allowing users to monitor and adjust the brushing angle and position for effective oral care. The pressure sensors may provide feedback to the user by changing the color of the brush head, emitting a sound, or vibrating the toothbrush.

The presently disclosed electrical toothbrush may further comprise a system comprising of a control system with a processor to automatically transition between different movement mechanisms based on user preferences or brushing requirements. The system and the control system may be configured to adjust the brushing duration in each mode of brush head operations based on individual user habits and dental care needs. The device may further comprise customizable multi-mode cleaning options, allowing users to combine or sequence different movement mechanisms for a personalized brushing experience.

The present electrical toothbrush may further have Bluetooth to communicate with an app on a phone having a user interface to allow a user to select different brushing modes and settings. The may system comprises smart connectivity features, enabling communication with external devices such as smartphones or tablets for data synchronization, usage tracking, and remote control. Smart connectivity features may comprise oral health analytics, providing users with insights into brushing habits, areas of improvement, and personalized recommendations. It may also comprise of support multiple user profiles, allowing different users to store and retrieve their preferred brushing modes and settings.

The invention claimed is:

1. An electric toothbrush, comprising:
   a. a main shaft having an off position which defines an X axis;
   b. a brush head connected to the main shaft having bristles wherein the bristles define a Y axis in the off position, wherein the Y axis is perpendicular to the X axis, the X and Y axes defining an X-Y plane, and a Z axis perpendicular to the X and Y axes, and wherein the X and Z axis defining an X-Z plane and the Z and Y axes defining a Z-Y plane;
   c. a motor configured to produce a rotation;
   d. a multi-directional movement mechanism connected to the brush head through the main shaft to provide a plurality of independent movements, comprising:
      i) a gear system aligned in the Z-Y plane comprising a main gear that has one or more partial teeth sections on its outer or inner perimeter, and a first, a second, and a third gear positioned equally spaced from each other along the outer or inner perimeter of the main gear, respectively, wherein B the main gear transmits the rotation of the motor to each of the first, the second, and the third gear, selectively, upon engaging with each of them, respectively; wherein rotational axes of the first, second, and third gear are parallel,
      ii) a first movement mechanism to transmit the rotation of the first gear to the main shaft to provide an oscillatory rotation of the brush head around the X axis;
      iii) a second movement mechanism to transform the rotation of the second gear to the main shaft to provide an oscillatory side-to-side movement of the brush head aligned in the X-Z plane, and
      iv) a third movement mechanism to transform the rotation of the third gear to the main shaft to provide an oscillatory back-and-forth movement of the brush head aligned in the X-Y plane;
      v)
   e. a control system to turn on and off the electric toothbrush and to allow a user to select a movement from each of the plurality of the independent movements;
   f. a power system to provide power to the electric toothbrush, and
   g. an ergonomic waterproof shell to protect the electric toothbrush.

2. The electrical toothbrush of claim 1, wherein the motor is connected to the main gear through a motor coupling to provide the oscillatory rotation for the main gear.

3. The electrical toothbrush of claim 1, wherein
   a) the first gear is coupled to the main shaft to transmit the oscillatory rotation motion of the first gear to the main shaft, to provide the oscillatory rotation of the brush head around the X axis, whereby the first movement mechanism is activated by the main gear engaging the first gear and rotating it;
   b) the second gear is coupled to the main shaft via a second motion conversion linkage system that is configured to transform the oscillatory rotation motion of the second gear into the oscillatory side-to-side movement of the brush head and the main shaft, aligned in the X-Z plane to, whereby the second movement mechanism is activated by the main gear engaging the second gear and rotating it;

c) the third gear is coupled to the main shaft via a third motion conversion linkage system that is configured to transform the oscillatory rotation motion of the third gear into the oscillatory back-and-forth motion movement of the brush head and the main shaft, aligned in the X-Y plane, whereby the third movement mechanism is activated by the main gear engaging the third gear and rotating it, and d) each motion conversion linkage system comprises a rod end bearing connected to the main shaft, an L-shaped shaft pivotally slotted in the rod end bearing at one end and connected to the second or third gear through a bearing, and a pin that rotatably hinges the rod end bearing, wherein the L-shaped shaft rotates in sync with the second or third gear and causes the rod end bearing to pivot around the pin, and the opposite end of the rod end bearing that is coupled to the main shaft moves along the pin axis.

4. The electrical toothbrush of claim 3, wherein the rod end bearing is mounted on the main shaft at a 90-degree angle to each other, thereby the oscillatory rotational of the main gear is converted into the second and third movement aligned in two different planes perpendicular to each other, the X-Z and X-Y, respectively.

5. The electrical toothbrush of claim 1, having a spring system comprises a set of springs connected to the main shaft at one end and the shell at the other end to hold and return the main shaft to the off position, wherein the off position refers to a position in which the main shaft is aligned in the X axis and the bristles are aligned in the Y axis, whereby the spring system is activated after toothbrush initiating a movement and before initiating a new movement while the main gear is not engaged with any of the first, second, and third gears.

6. The electrical toothbrush of claim 1, wherein the main shaft is coupled to the first gear through a universal joint, enabling the main shaft to bend in various directions and allowing the second movement mechanism and the third movement mechanism to operate independently.

7. The electrical toothbrush of claim 1, wherein the brush head is detachable.

8. The electrical toothbrush of claim 1, wherein the control system comprises a push button or touchpad to manage power on/off and selection of each of the plurality of the movements, and an electronic board to control and command motor based on the push button or touchpad's selection.

9. The electrical toothbrush of claim 1, wherein the motor is a variable speed motor with a controller, allowing users to adjust the speed of the oscillatory movements of the brush head.

10. The electrical toothbrush of claim 1, wherein the first, second, and third gear have individual gear ratios, providing different oscillation speeds in each of the plurality of the movement, whereby an increase in the gear ratio corresponds to a decrease in the speed of oscillation for the movement activated by that particular gear and a decrease in the gear ratio corresponds to an increase in the speed of oscillation for the movement activated by that particular gear.

11. The electrical toothbrush of claim 1, further having one or more sensors to determine the pressure or force applied by the toothbrush on teeth or gums.

12. The electrical toothbrush of claim 11, further having a system to provide feedback to the user as to the amount of pressure applied to teeth and gums.

13. The electrical toothbrush of claim 1, further having a timer and a control system configured to adjust the brushing duration in each mode of brush head operation based on individual user habits and dental care needs.

14. The electrical toothbrush of claim 1, further having a communication system to connect and communicate with an external device, wherein the external device is configured to allow a user to program the electrical toothbrush to operate in any desired mode.

15. The electrical toothbrush of claim 1, is further configured to adjust an amplitude of the motion for each of the plurality of the movement of the brush head.

* * * * *